A. A. BITTER.
VULCANIZER.
APPLICATION FILED SEPT. 12, 1917.

1,349,039.

Patented Aug. 10, 1920.

Witnesses
H. Gearing
Chas. J. Chum

Inventor,
Arthur A. Bitter,
By Raymond West Kuhler,
His Attorney.

UNITED STATES PATENT OFFICE.

ARTHUR A. BITTER, OF LOS ANGELES, CALIFORNIA, ASSIGNOR, BY MESNE ASSIGNMENTS, TO WESTERN VULCANIZER MANUFACTURING COMPANY, OF CHICAGO, ILLINOIS, A COPARTNERSHIP CONSISTING OF HERBERT K. WHEELOCK, FRANK A. WELLER, AND WALTER R. FONTAINE.

VULCANIZER.

1,349,039.   Specification of Letters Patent.   Patented Aug. 10, 1920.

Application filed September 12, 1917. Serial No. 190,946.

*To all whom it may concern:*

Be it known that I, ARTHUR A. BITTER, a citizen of the United States, residing at Los Angeles, in the county of Los Angeles and State of California, have invented new and useful Improvements in Vulcanizers, of which the following is a specification.

This invention relates to improvements in vulcanizers such as are used in repairing pneumatic tires, and resides in the provision of a device of this character which is particularly constructed and operated so that an entire section of a tire may be vulcanized in place, in a neat, expeditious and reliable manner.

One of the objects of the invention is to provide a vulcanizer of the above mentioned character in which a tire may be neatly repaired in such manner that mold marks or lines which appear at points on the tire where ends of the vulcanizing iron engage, are eliminated.

Another object is to provide in a vulcanizer of the above named character a means in the form of an interchangeable matrix which will cause the tread of a section of a tire which is being vulcanized in place, to take on the appearance of the particular tire tread of the tire proper;

The invention further consists in the particular combination, construction, association and mode of operation of the various parts and elements of the machine such as described in the following specification, illustrated in the accompanying drawings and finally as defined in the appended claims.

Heretofore in repairing a tire by adding a section thereto a special mold was required and a special mold was likewise required in retreading work. My invention aims to provide a single vulcanizer for use in retreading as well as in adding new tire sections and therefore reduces the cost of repairing tires, and provides a saving of time, floor space and equipment.

Figure 1:
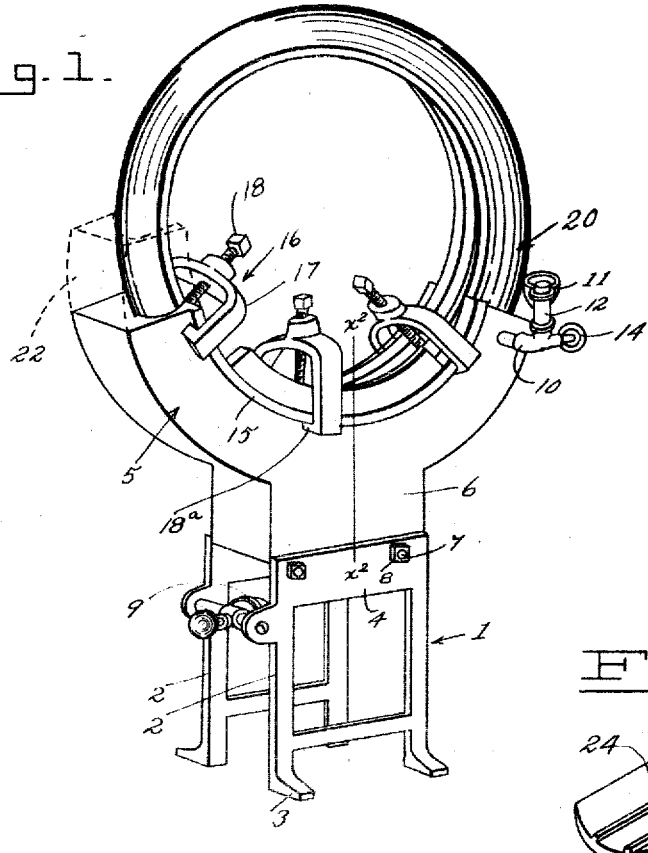
Figure 1 represents a perspective view of a vulcanizer constructed in accordance with the present invention.
Figure 5:
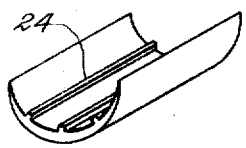
Figure 2:
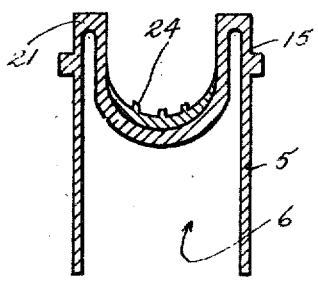
Fig. 2 is a fragmentary sectional view taken on line $x^2-x^2$ of Fig. 1.
Figure 3:
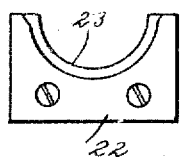
Fig. 3 is a top plan view of the block comprising the means for preventing the making of mold marks.
Figure 4:
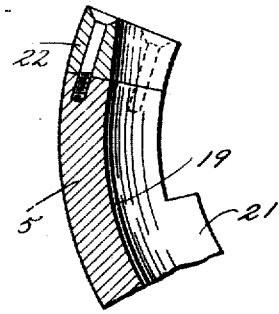
Fig. 4 is a fragmentary vertical sectional view of a part of the vulcanizing iron showing the block shown in Fig. 3 attached thereto, and, Fig. 5 is a detail perspective view of the matrix shown in position in Fig. 2.

Referring in detail to the accompanying drawings in which like parts are designated by like reference characters throughout the several views, 1 designates a stand comprising standards 2 having feet 3 and an upper structure 4.

A hollow vulcanizing iron generally designated 5 is secured upon the stand 1 and is of arcuate formation having a central depending tank portion 6. The tank portion 6 is secured by bolts 7 and nuts 8 or otherwise fastened to the upper structure 4 of the stand 1 and contains water. A burner 9 is located under the tank 6 between the sides of the structure 4 and may have a connection not shown with a suitable fuel supply also not shown.

Connected with the iron 5 at one end thereof is a pipe 10 having a filling cup 11 and an escape valve 12 connected therewith. A valve 14 is associated with and controls the filling cup. Lateral flanges 15 are formed on the upper curved edges of the iron and upper surfaces for coöperation with clamps 16 provided to hold the tire in place in the iron. These clamps comprise U-shaped body portions 17 and screw bolts 18 threaded in the bight portions thereof, the ends of the body portions being formed with inwardly extending flanges 18ª for coöperation with the flanges 15. The hereinbefore described apparatus is standard and common to the majority of vulcanizers. The upper surface of the iron is grooved or concaved longitudinally at 19 to receive a tire as shown at 20 in Fig. 1 of the drawings.

In carrying out my invention there are provided flanges or extensions 21 on the upper side of the iron 5. These flanges or extensions are curved or arcuately formed and their inner sides are flush, preferably with the sides of the groove or concavity 19.

By forming the flanges of hollow construction the heat distribution of the iron is materially increased and it will be seen that the flanges comprise means for supporting and conveying heat, through bead molds of ordinary construction, not shown, to the sides of a section to be vulcanized, so that a thorough and reliable vulcanizing action will take place throughout the entire area of the section of the tire being repaired. Said bead molds are held in place by the extensions or flanges.

There is provided means for preventing the iron from marking the tire at points where the iron ends contact therewith and to this end the iron or mold has its extremities constructed to retard heat transmission. The means preferably comprises wooden or other non-heat conducting blocks 22 which are suitably secured to the ends of the iron 5 in close relation to said ends. The blocks may be constructed of material other than wood and do not necessarily have to be non-metallic, inasmuch as the only requirement is the provision of mold extremities or extensions at the ends of the extremities which are arranged, formed and constructed to retard the transmission of heat to the tire.

The inner faces of the blocks are formed with concavities or grooves 23, said grooves being registered with the groove 19 in the iron and adapted to receive a tire when the latter is clamped to the iron. The grooves in these blocks increase in depth and in width from their lower or inner ends to their upper or outer ends, or in other words, the walls of the grooves diverge in all directions from the lower edges to the upper edges of the blocks, wherefore each groove 23 flares throughout its length from its inner end to its outer end, so that said walls gradually diverge from tire engaging position and do not offer an abrupt or sharp edge or surface to cause a mold mark. The heat from the iron 5 does not affect the wood blocks as readily as it would metal blocks and the use of wood in this way prevents the causing of marks by heat upon the tire as in the case with the ordinary vulcanizers.

There is also provided a sectional matrix 24 for molding the insert or section tread to correspond in appearance to the tread of the tire being repaired. This matrix is curved in cross section and of arcuate formation longitudinally so as to lie in the groove 19 of the iron 5 and is interchangeable or removable. The matrix shown is adapted to rib the tread of a section or of a complete new tread so as to make the tire take on the appearance of a ribbed tread. The design of the mold or matrix may be as desired. The matrix, in being sectional may be easily removed from the tire.

To vulcanize a tire with the hereinbefore described vulcanizer, so as to vulcanize a section or new tread in place, the tire after being properly prepared is placed within groove 19 of the iron 5. If the tire section or new tread is to be molded to take on the appearance of the main tire tread, or it is desired to impart a ribbed appearance to a new tread, the matrix 24 is first put in place in the groove 19 of the iron and the section of the tire is placed upon said matrix. The tire and section are clamped in place by the clamps 16 and the burner 9 is ignited so as to heat the iron 5 in the ordinary manner to provide a vulcanizing action. The extensions or flanges 21 embrace and engage the sides of the bead molds, not shown, so as to support them and convey heat therethrough to the tire and section at these points. The vulcanizing action is in this way carried out throughout the entire area of the juncture of tire and section. The wood blocks 22 do not become so heated and are not hard enough that the tire will be marked in an unsightly manner thereby, owing to the particularly formed grooves 23 therein which diverge from engagement with the tire and do not offer sharp edges for engagement therewith.

It will thus be seen in reference to the foregoing description and accompanying drawings that I have provided a simply constructed, inexpensive and comparatively small vulcanizer with which tires may be exceptionally neatly, lastingly, effectively, cheaply and quickly repaired.

It will be seen that the extremities or blocks 22 at the ends of the mold are removable, the fastening means employed being preferable in the form of screws. By providing for the removal of these blocks it is possible to readily renew them when worn or in case they should not fit properly. In some instances when the matrix is being used and the ends of the matrix are disposed adjacent to the inner ends of the blocks it will be necessary to fit blocks to the mold of such character that the grooves therein will come flush with the outer faces of the matrix. This is necessary in order to avoid the forming of mold marks upon the tire.

The foregoing description and accompanying drawings describe and illustrate the preferred embodiment of the invention and it is to be understood that various minor changes in details of construction and as to the size, shape and proportion of parts of the vulcanizer, concurrent with the adoption thereof, may be resorted to when required, without departing from the spirit and scope of the invention as defined.

Having thus described my invention, what I claim and desire to secure by Letters Patent is:

1. In a vulcanizer, a vulcanizing iron having an arcuate tire receiving groove therein, and a block of nonmetallic material secured to one end of the iron and having a groove forming a continuation of the tire receiving groove in the vulcanizing iron, the groove of the block flaring throughout its length from its inner end to its outer end to prevent marking of a tire under treatment in the vulcanizer.

2. A vulcanizer, comprising a mold having a tire-receiving groove therein, and means at the ends of the mold for retarding heat retention and transmission, said means having tire-receiving grooves registering with the tire-receiving groove in the mold; said last named grooves being diverged in all directions from their inner to their outer ends.

3. A vulcanizer comprising a mold having a tire receiving groove therein and a grooved terminal member at one end of the mold, said terminal member being of heat nonconducting material and having its groove forming a continuation of the groove in the mold and also flaring throughout its length outwardly from its joint with said mold groove to prevent marking of a tire under treatment in the vulcanizer.

4. A vulcanizer comprising a mold having a tire receiving groove therein and a grooved terminal member at one end of the mold, said terminal member being of heat nonconducting material and having its groove forming a continuation of the groove in the mold and also flaring throughout its length outwardly from its joint with said mold groove to prevent marking of a tire under treatment in the vulcanizer, and a matrix for the grooved portion of said terminal member and configured to produce configuration upon the tire under treatment.

5. A vulcanizer mold having a longitudinally curved tread forming face having ends retreating outwardly from the normal circle of its central portion.

6. A vulcanizer comprising a mold having a tire receiving groove therein, and individual grooved terminal members at the respective ends of the mold, each terminal member being of heat nonconducting material and its groove forming a continuation of the groove in the mold and also flaring throughout the length of the terminal member outwardly from its joint with the said groove to prevent marking of a tire under treatment in the vulcanizer.

In testimony whereof I have signed my name to this specification in the presence of two subscribing witnesses.

ARTHUR A. BITTER.

Witnesses:
CHAS. J. CHANES,
J. SHUTT.